(12) United States Patent
Krig

(10) Patent No.: US 9,378,181 B2
(45) Date of Patent: Jun. 28, 2016

(54) SCALABLE COMPUTING ARRAY

(71) Applicant: Intel Corporation, Santa Clara, CA (US)

(72) Inventor: Scott Krig, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 754 days.

(21) Appl. No.: 13/672,828

(22) Filed: Nov. 9, 2012

(65) Prior Publication Data

US 2014/0136816 A1 May 15, 2014

(51) Int. Cl.
| | | |
|---|---|---|
| *G06F 15/00* | (2006.01) | |
| *G06F 15/76* | (2006.01) | |
| *G06F 15/80* | (2006.01) | |
| *G06F 9/30* | (2006.01) | |
| *G06F 9/38* | (2006.01) | |

(52) U.S. Cl.
CPC ........ *G06F 15/8007* (2013.01); *G06F 9/30007* (2013.01); *G06F 9/30014* (2013.01); *G06F 9/30036* (2013.01); *G06F 9/3887* (2013.01)

(58) Field of Classification Search
CPC ............... G06F 15/8007; G06F 2212/1048
See application file for complete search history.

(56) References Cited

U.S. PATENT DOCUMENTS

| | | | | |
|---|---|---|---|---|
| 5,790,877 | A * | 8/1998 | Nishiyama et al. | 713/323 |
| 2002/0066910 | A1* | 6/2002 | Tamemoto et al. | 257/200 |
| 2004/0054879 | A1* | 3/2004 | Macy, Jr. | G06F 9/30014 712/221 |
| 2006/0236075 | A1* | 10/2006 | Hara | G06F 9/30014 712/22 |
| 2006/0288070 | A1* | 12/2006 | Vadi | G06F 7/02 708/524 |
| 2007/0180006 | A1* | 8/2007 | Gyoten | G06F 13/1652 708/200 |
| 2007/0245317 | A1* | 10/2007 | Hong et al. | 717/130 |
| 2008/0052492 | A1* | 2/2008 | Stuttard et al. | 712/22 |
| 2008/0189524 | A1* | 8/2008 | Poon et al. | 712/221 |
| 2009/0113170 | A1* | 4/2009 | Abdallah | G06F 15/80 712/17 |
| 2010/0095088 | A1* | 4/2010 | Vorbach | G06F 9/30036 712/29 |
| 2012/0166762 | A1* | 6/2012 | Park et al. | 712/20 |
| 2013/0290674 | A1* | 10/2013 | George et al. | 712/201 |

* cited by examiner

*Primary Examiner* — Hyun Nam
(74) *Attorney, Agent, or Firm* — International IP Law Group, P.L.L.C.

(57) ABSTRACT

A method and apparatus for providing a scalable computing array are provided herein. The method includes determining a width of a processor based on a software program, and a specified policy. The processor may be configured to comprise a number of lanes based on the width, and a thread of the software program may be executed using the configured processor.

29 Claims, 12 Drawing Sheets

150

500

SCALABLE COMPUTING ARRAY

BACKGROUND

1. Field

This disclosure relates generally to processor arrays such as single instruction multiple data (SIMD) arithmetic and logical unit (ALU) arrays, and very long instruction word (VLIW) computing machines.

2. Description

Imaging workloads, such as camera input, print, and display imaging workloads, are typically processed using VLIW and SIMD computer processors. Alternatively, a system on a chip (SOC) may implement SIMD using single instruction multiple thread (SIMT) processors. An SIMT processor includes SIMDs units running in parallel. Such systems are typically configured to use ALU arrays of a specific width to accommodate the particular machine instruction being processed. As used herein, the width of the processor refers to the number of lanes in the particular processor. A lane includes one ALU and at least one register. Computing machines may have different instruction widths for processing vectors or data using a single instruction with multiple data, otherwise known as SIMD processing. Generally, an SIMD processing unit may include lanes that perform various operations, such as floating point calculations and integer calculations. The integer SIMD lane may also be referred to as an ALU lane, as the hardware for an integer SIMD lane and an ALU is nearly identical.

However, because many instructions do not occupy the full width of the processor, SIMD processors may be under-utilized for parts of some workloads. For example, SIMD processors are typically under-utilized when processing imaging workloads. Accordingly, a portion of the available processing power is not used to perform any processing, while the unused portion of the processor remains in an active state that uses power and generates heat. The additional heat from the unused portion of the processor must also be cooled. For mobile devices in particular, SIMD under-utilization reduces valuable battery life as a result of the added power consumption from powering the unused portion of the processor as well as cooling the unused portion of the processor. One approach to eliminate the additional power consumption involves SIMD compilers generating executables that fill the SIMD ALU lanes, when possible. However, this approach still leaves many of the available SIMD lanes under-utilized.

BRIEF DESCRIPTION OF THE DRAWINGS

The following detailed description may be better understood by referencing the accompanying drawings, which contain specific examples of numerous objects and features of the disclosed subject matter.

DETAILED DESCRIPTION

Figure 1A:
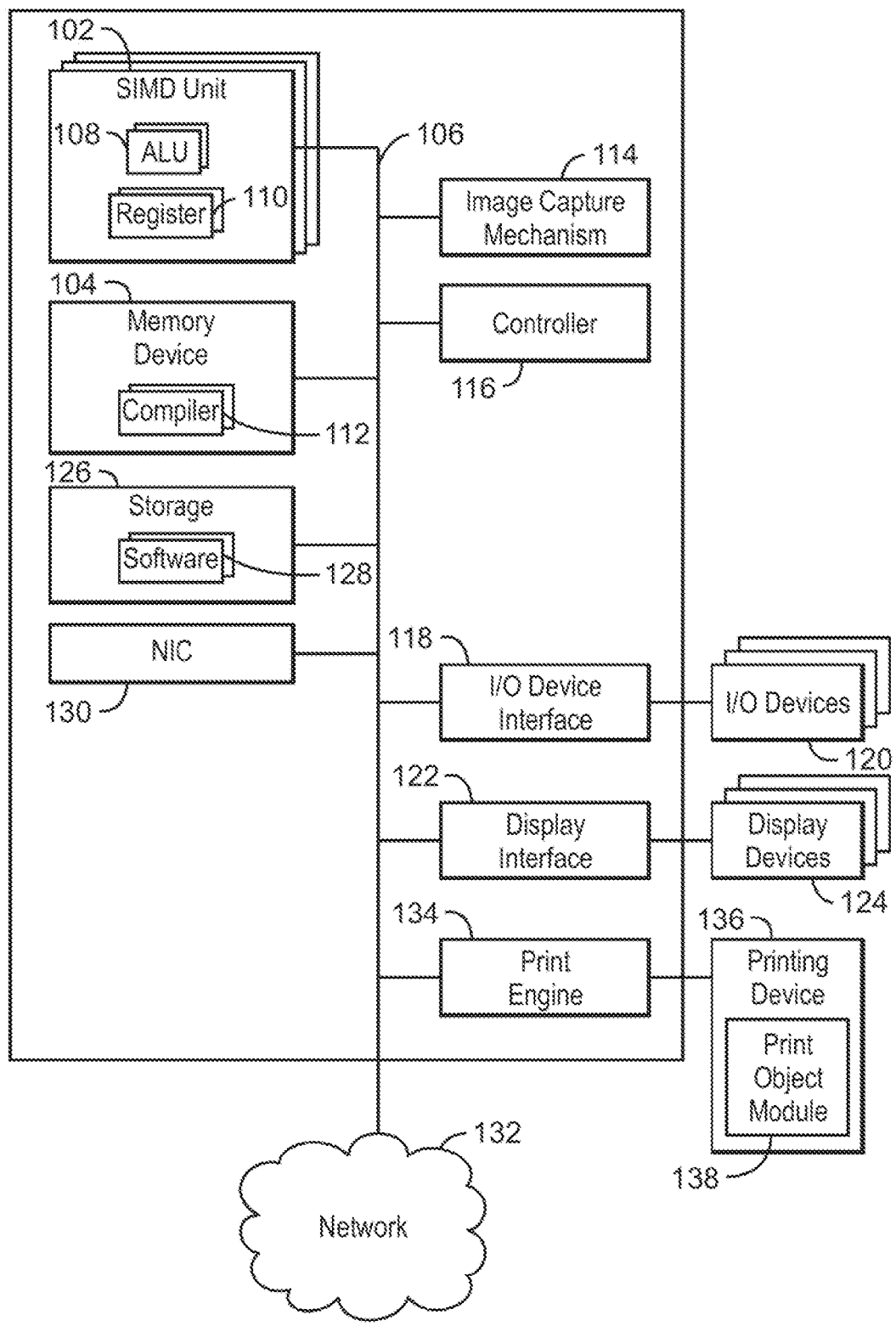
FIG. 1A is a block diagram of a computing device that may be used in accordance with embodiments.

As discussed above, there are many computing instructions that do not occupy the full width of SIMD or SIMT processors. As described herein, SIMD processor and SIMD processing unit may be used interchangeably. General purpose workloads using computer languages such as Open CL, Render Script, Open MP, or C++ AMP typically include instructions that do not map well into SIMD processors, as portions of the processor are generally un-used when processing instructions. As a result, computing capabilities of the processor are active but not performing any operations. As used herein, active refers to a state that consumes power and is on, while inactive refers to a state that does not generate power and is off. Furthermore, a state may be defined by a policy and include at least one of a power off state, a low power state, a normal power state, a high power state, a power burst state, or any combination thereof. A policy provides guidance on the operation of components of a computing system. Each state may include a pre-determined voltage and frequency level within the policy. In embodiments, the voltage and frequency level may be set manually or dynamically, based on score boarding and monitoring of resource utilization. The voltage and frequency level may also be set automatically based on a policy setting generated by a compiler, or programmed into a control register at run-time.

Embodiments described herein relate to a scalable computing array. In this invention, the width of a processor may be dynamically configured at execution time based on the available ALUs and a policy. Dynamic reconfiguration enables varying lane widths and clock rates for lanes. Moreover, dynamic configuration enables unused lanes to be powered off, resulting in reduced power consumption. In embodiments, a lane may be n-wide, where n represents the number of lanes within the total available lanes for the machine instructions. For example, if 16 lanes are available, then an embodiment may partition the 16 lanes one 12-wide lane grouping one 4-wide lane grouping. In this manner, there are two groups created from the available 16 lanes. The configuration of lanes into groups may be based on a desired utilization policy for specific computing workloads. For example, the computing workload may include a VLIW, and the 12-wide lane grouping may be used to process the VLIW based on one clock. In another example, the 16-lanes may be partitioned into 4 groups based on a utilization policy, each group having 4 lanes. Each group of 4 lanes may have use different, independent clock to process data, thereby creating multiple SIMD units. In embodiments, a set of machine instructions are used to configure the width of each processor.

Machine instructions may also be used to configure a VLIW processor and a power policy for any type of processor. Furthermore, each processor may be configured using a context control register. In embodiments, image processing, print imaging, display imaging, signal processing, computer graphics, media and audio processing, data mining, video analytics, and numerical processing workloads may be processed using a scalable computing array.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1A is a block diagram of a computing device 100 that may be used in accordance with embodiments. The computing device 100 may be, for example, a laptop computer, desktop computer, tablet computer, mobile device, or server, among others. The computing device 100 may include an SIMD processing unit 102 that is configured to execute stored instructions, as well as a memory device 104 that stores instructions that are executable by the SIMD processing unit 102. The CPU may be coupled to the memory device 104 by a bus 106. Additionally, the SIMD processing unit 102 can be a component of a single core processor, a multi-core processor, a computing cluster, or any number of other configurations. Additionally, the SIMD processing unit 102 may be a component of a graphics processing unit (GPU), and may be configured to perform any number of graphics operations within the computing device 100. For example, the SIMD processing unit may be configured to render or manipulate graphics images, graphics frames, videos, or the like, to be displayed to a user of the computing device 100. The computing device 100 may include more than one SIMD processing unit 102. The instructions that are executed by the SIMD processing unit 102 may be used to provide a scalable computing array.

Within the SIMD processing unit 102, there may be one or more ALU arrays 108 and one or more register arrays 110. The ALU array 108 may be used to perform arithmetic and logical operations on the data stored in the register array 110. The register array 110 is a special purpose memory that may be used to store the data that is used as input to the ALUs, and may also store the resulting data from the operation of the ALUs. The data may be transferred to and from the memory device 104 to the registers 110. The memory device 104 can include random access memory (RAM), read only memory (ROM), flash memory, or any other suitable memory systems. For example, the memory device 104 may include dynamic random access memory (DRAM). The memory device 104 may also include a compiler 112 that is configured to compile a software program and determine the width of the processor based on a width of an instruction of the software program. The compiler 112 may be software, an application program, application code, or the like.

The computing device 100 includes an image capture mechanism 114. In embodiments, the image capture mechanism 114 is a camera, stereoscopic camera, infrared sensor, or the like. The image capture mechanism 114 is used to capture image information. In embodiments, the image capture mechanism may be a camera device that interfaces with a host processor using an interface developed according to specifications by the Mobile Industry Processor Interface (MIPI) Camera Serial Interface (CSI) Alliance. For example, the camera serial interface may be a MIPI CSI-1 Interface, a MIPI CSI-2 Interface, or MIPI CSI-3 Interface. Accordingly, the camera serial interface may be any camera serial interface presently developed or developed in the future. In embodiments, a camera serial interface may include a data transmission interface that is a unidirectional differential serial interface with data and clock signals. Moreover, the camera interface with a host processor may also be any Camera Parallel Interface (CPI) presently developed or developed in the future. In embodiments, the host processor includes an SIMD processing unit as described herein for imaging operations. The SIMD processing unit 102 can take as input SIMD instructions from a workload and perform operations in parallel. For example, the image capture mechanism 114 may be used to capture images for processing. The image processing workload may contain an SIMD instruction set, and the SIMD processing unit 102 may be used to process the instruction set. A controller 116 can be used to configure the ALU lanes of the SIMD processing unit as discussed below.

The SIMD processing unit 102 may be connected through the bus 106 to an input/output (I/O) device interface 118 configured to connect the computing device 100 to one or more I/O devices 120. The I/O devices 120 may include, for example, a keyboard and a pointing device, wherein the pointing device may include a touchpad or a touchscreen, among others. The I/O devices 120 may be built-in components of the computing device 100, or may be devices that are externally connected to the computing device 100.

The SIMD processing unit 102 may also be linked through the bus 106 to a display interface 122 configured to connect the computing device 100 to a display device 124. The display device 124 may include a display screen that is a built-in component of the computing device 100. The display device 124 may also include a computer monitor, television, or projector, among others, that is externally connected to the computing device 100.

The computing device also includes a storage device 126. The storage device 126 is a physical memory such as a hard drive, an optical drive, a thumbdrive, an array of drives, or any combinations thereof. The storage device 126 may also include remote storage drives. The storage device 126 includes any number of software 128 that are configured to run on the computing device 100. The software 128 may be used to implement a scalable computing array. Moreover, the software 128 may include but is not limited to, very long instruction words (VLIW) and single instruction multiple data (SIMD) instructions. A VLIW may be processed using several SIMD processing units, with each unit running on the same clock. Accordingly, a VLIW may group several SIMD processing units together. An SIMD instruction may be processed using multiple lanes of varying widths in an SIMD processing unit. Furthermore, the group of lanes used to process an SIMD instruction may run using several different, independent clocks.

The computing device 100 may also include a network interface controller (NIC) 130 may be configured to connect the computing device 100 through the bus 106 to a network 132. The network 132 may be a wide area network (WAN), local area network (LAN), or the Internet, among others.

In some embodiments, an SIMD processing unit can send the resulting image from a processed workload to a print engine 134. The print engine 134 can send the resulting image to a printing device 136. The printing device 136 can include printers, fax machines, and other printing devices that can print the resulting image using a print object module 138. The print object module is discussed in greater detail in relation to FIG. 9. In embodiments, the print engine 134 may send data to the printing device 136 across the network 132.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., sensors, power management integrated circuits, additional network interfaces, etc.). Furthermore, any of the functionalities of the SIMD processing unit 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 1B:
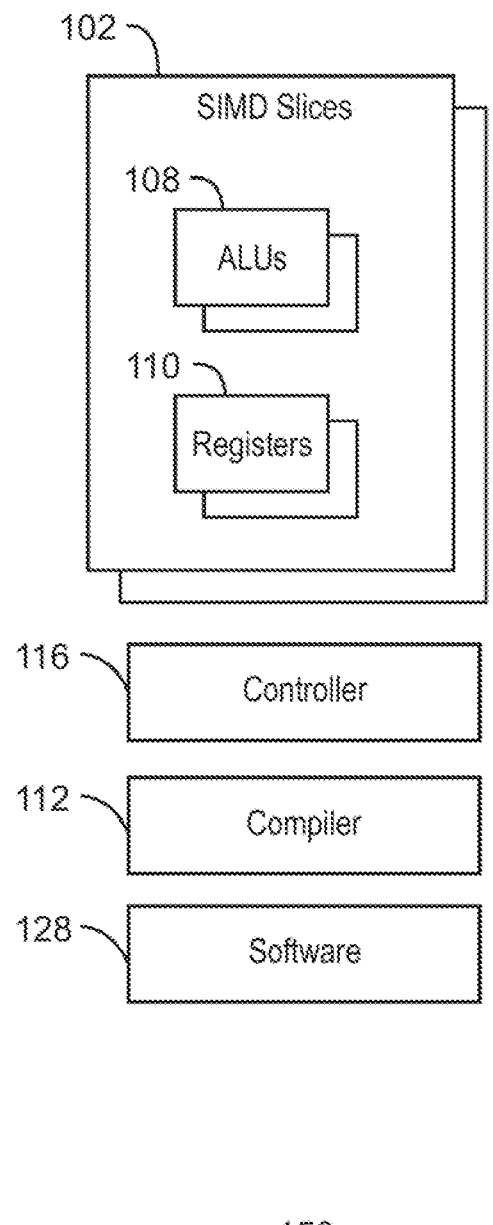
FIG. 1B is a computing device that may be used to provide a scalable computing array in accordance with embodiments.

FIG. 1B is a computing device 150 that may be used to provide a scalable computing array in accordance with embodiments. The computing device 150 includes an SIMD unit 102. Each SIMD unit 102 includes one or more ALU arrays 108 and one or more register arrays 110. The computing device 150 also includes a controller 116 and a compiler 112. Further, the computing device 150 includes software 128.

In an embodiment, the ALU arrays and register arrays are provided and the ALU lane width of an SIMD processing unit is dynamically configured based on the particular software being executed. In this manner, the width of the processing unit is based on the particular problem being addressed in each piece of software run on the computer. Moreover, the size of ALU lanes may be configured at run time.

The SIMD processing unit 102 may be a homogenous SIMD processing unit or a heterogeneous SIMD processing unit. An SIMD processing unit is homogenous when each SIMD slice of the SIMD processing unit is the same width. An SIMD processing unit is heterogeneous when the SIMD slices within the SIMD processing unit are of different sizes. A slice refers to a set or grouping of lanes, wherein each lane includes at least one ALU and at least one register. Each slice of the SIMD processing unit 102 may be powered on or off, depending on the size of the workload.

Accordingly, an array of ALUs may be partitioned dynamically at run time into separate groups, where each group is controlled by a single instruction. The groups may create a set of SIMD processing units. The SIMD processing units may also be referred to as SIMD machines. Each SIMD machine may be separately controlled, separately clocked, and separately power gated on or off. Further, the SIMD machines may be grouped together in order to process VLIWs. The SIMD machines grouped together to process a VLIW may be controlled and clocked as a group, as well as power gated on or off as a group. Dynamic reconfiguration of ALU lanes into SIMD and VLIW machines is based in part on a programmable policy which is generated in machine language code, which the reconfigurable array uses to assign ALU lanes together into groups and set clock frequencies.

Figure 2:
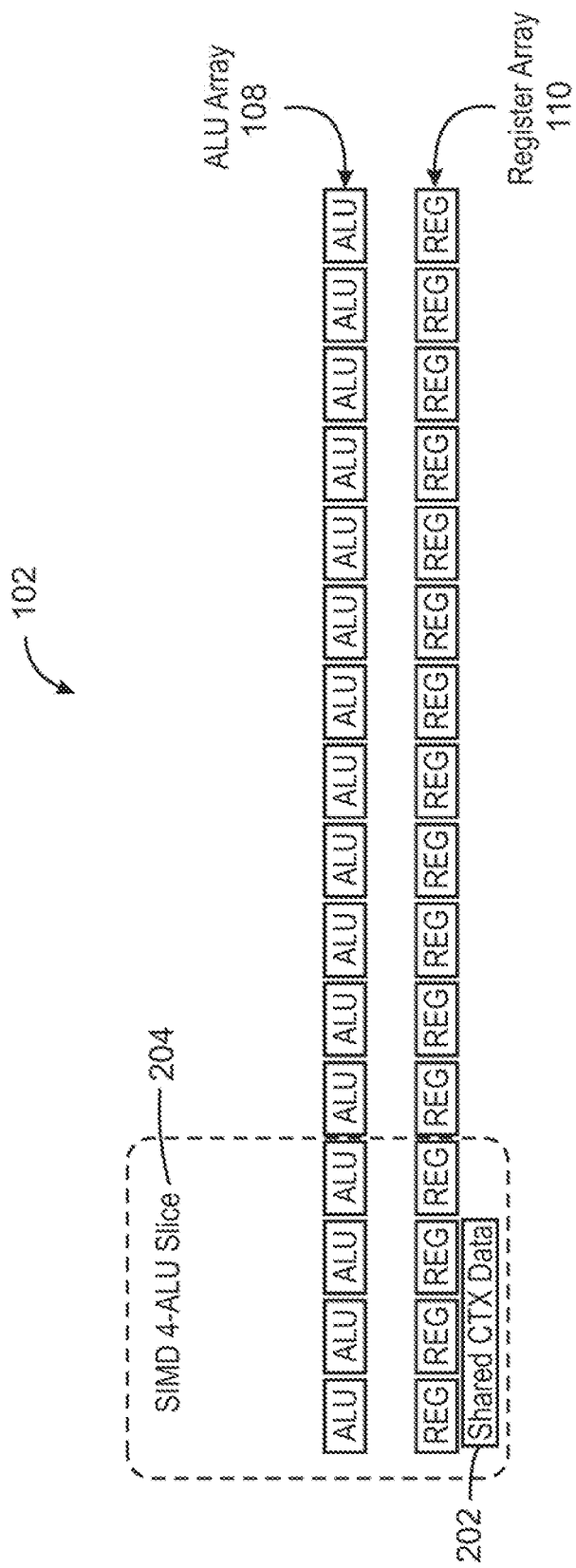
FIG. 2 is a diagram illustrating an SIMD processing unit, in accordance with embodiments.

FIG. 2 is a diagram 200 illustrating an SIMD processing unit 102, in accordance with embodiments. Each SIMD slice of an SIMD processing unit 102 includes an ALU array 108 and a register array 110. The register array may be a component of a shared memory that also includes shared context of machine (CTX) data 202. The ALU array 108 and the register array 206 may be used to process data as described above. The shared CTX data 202 may store machine contexts and associated data, such as program counters, register settings, clock frequencies, voltage levels, and all other machine state data.

The SIMD processing unit 102 shows an SIMD ALU slice 204 that includes four lanes. Thus, the SIMD ALU slice 204 is an SIMD 4-ALU slice, wherein the width of each slice is the number of lanes in each slice. The ALUs and the registers contained within the SIMD ALU slice 204 are denoted by a dotted line. In embodiments, the configuration of the lanes may occur dynamically at runtime, prior to processing an instruction set using the SIMD processing unit 102. For example, a compiler 112 (FIGS. 1A and 1B) may be used to determine the longest SIMD instruction word needed as the software to be executed is compiled. The longest instruction word, as determined by the compiler, may be used to determine the width of each SIMD slice. Thus, if the longest data vector is determined by the compiler to be 4 units long, then the width of the SIMD slice may be configured to a size of 4 lanes. The register array is also configured to correspond to the SIMD width and may be used to store the computation results from the instruction that was executed. The compiler can determine the width of the ALU processor array based on instructions of the program being compiled and the compiler generates machine code instructions to allow the scalable ALU array to reconfigure itself accordingly. Alternatively, machine code may be hand generated directly by an engineer without a compiler to accomplish the same scalable ALU array configuration.

In another embodiment, a set of control and status registers are used to set the policy for the VLIW and SIMD lane assignments, as well as the power policy, voltage levels, and clock rates for various states of processing.

Figure 3A:
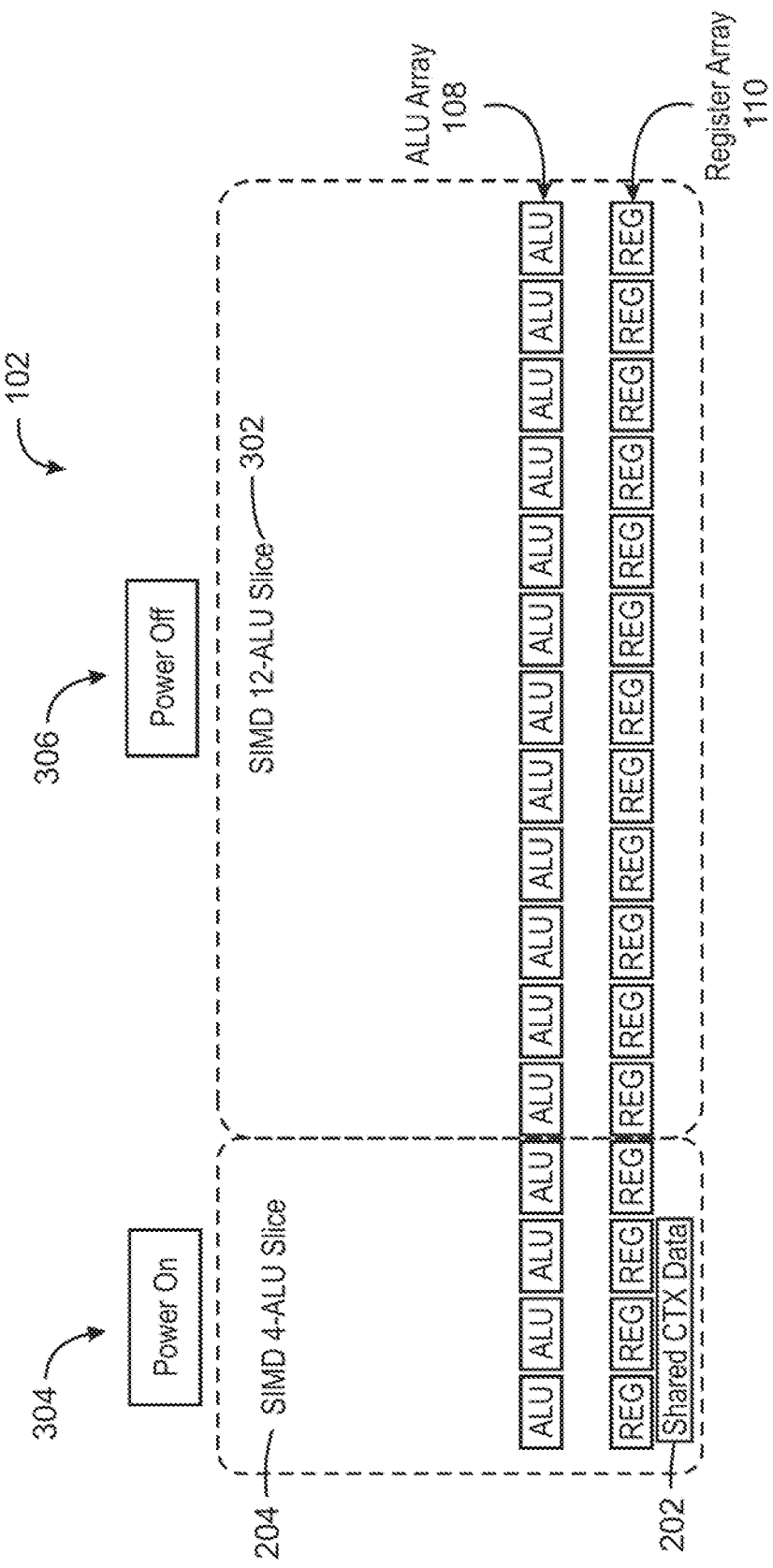
FIG. 3A is a diagram illustrating the SIMD processing unit with two SIMD slices, in accordance with embodiments.

FIG. 3A is a diagram 300 illustrating the SIMD processing unit 102 with two SIMD slices, in accordance with embodiments. The SIMD processing unit 102 includes the SIMD ALU slice 204 that includes 4 lanes as discussed in FIG. 2. The diagram 300 illustrates an additional SIMD ALU slice 302 that includes 12 lanes, with each of the twelve lanes including an ALU and a register.

In embodiments, a controller may be used to dynamically configure the width of the SIMD slices as the software 128 (FIGS. 1A and 1B) is executing. The unused SIMD ALU's may be powered off as a result of the dynamic configuration while the software is executing. If several ALUs have been unused for a predetermined amount of time, the controller may power off the unused ALUs. The predetermined amount of time may be set in light of performance or power considerations and can be embodied in a power-policy machine instruction that is implemented dynamically at run time. The power-policy machine instructions may be generated by a compiler or else manually coded by an engineer. In other embodiments, a set of command and status registers may be used to implement policies, control lane width settings, power settings, voltage and frequency settings, and other operational parameters. As a result, less power is consumed by the SIMD processing unit while the performance of the ALU unit is unaffected.

Continuing with the example from FIG. 2, the SIMD ALU slice 204 may be powered on, as shown by the powered on state 304. The SIMD ALU slice 302 may be powered off, as shown by the powered off state 306. In embodiments, a compiler such as the compiler 112 may generate machine instructions to cause the controller to power off the additional ALUs at runtime. Additionally, in embodiments, a controller may power off the additional ALUs while the software is executing if the ALUs have been inactive for a predetermined amount of time. The controller is programmable using the command and status registers, or the controller may be controlled by a logic state machine. As used herein, an inactive ALU occurs when the ALU is not used to process a workload.

Figure 3B:
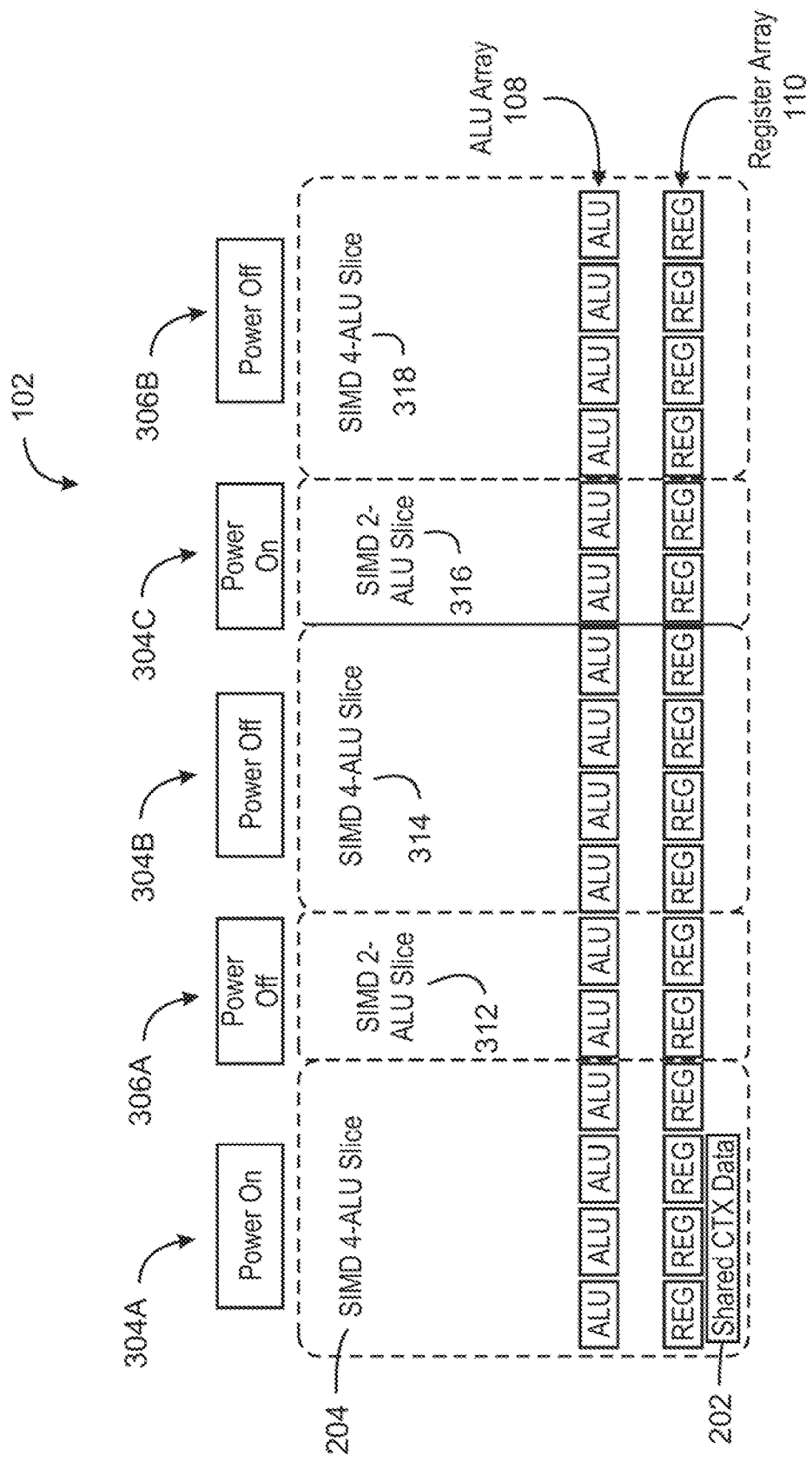
FIG. 3B is a diagram illustrating the SIMD processing unit configured with five SIMD slices, in accordance with embodiments.

FIG. 3B is a diagram 310 illustrating the SIMD processing unit 102 configured with five SIMD slices, in accordance with embodiments. The SIMD processing unit 102 includes the SIMD ALU slice 204 that includes four lanes as discussed in FIG. 2. The diagram 310 illustrates four additional slices. Specifically, the SIMD processing unit illustrates an SIMD ALU slice 312 that includes two lanes, an SIMD ALU slice 314 that includes four lanes, an SIMD ALU slice 316 that includes two lanes, and an SIMD ALU slice 318 that includes four lanes. As shown in FIG. 3B, the SIMD ALU slice 204, the SIMD slice 314, and the SIMD ALU slice 316 are all powered on, as denoted by the power on status 304A, the power on status 304B, and the power on status 304C above each SIMD slice, respectively. Similarly, the SIMD ALU slice 312 and the SIMD ALU slice 318 are both powered off, as denoted by the power off status 306A and the power off status 306B above each SIMD slice, respectively.

In embodiments, the SIMD ALU Slice 312 and the SIMD ALU Slice 318 are both powered off in response to a determination by the controller that the ALU units within both the SIMD ALU Slice 312 and the SIMD ALU Slice 318 have been inactive. Inactivity may be determined by the controller monitoring the ALUs, and the ALUs that have been idle for more than a predetermined amount of clock cycles may be turned off. Alternatively, a program counter could be used to determine which ALUs could be powered off. The heterogeneous SIMD slices in FIG. 3B may contain various threads which are balanced to include no stall, high stall, medium stall, or any other combination which meets various policy criteria such as performance. A stall refers to the situation where instructions are not available for processing at a particular clock cycle. The stall may be introduced by the controller to coordinate the processing of instructions that may rely on data from the execution of other instructions. The policy may specify the how to balance any stalls, as well as thread priority, power targets, performance targets, thread resource use priority, thread memory hierarchy preferences for pinning pages. In embodiments, determining the width of the SIMD processing unit includes invoking a function call from within the thread, and the function call may specify the width of the processor.

Figure 4A:
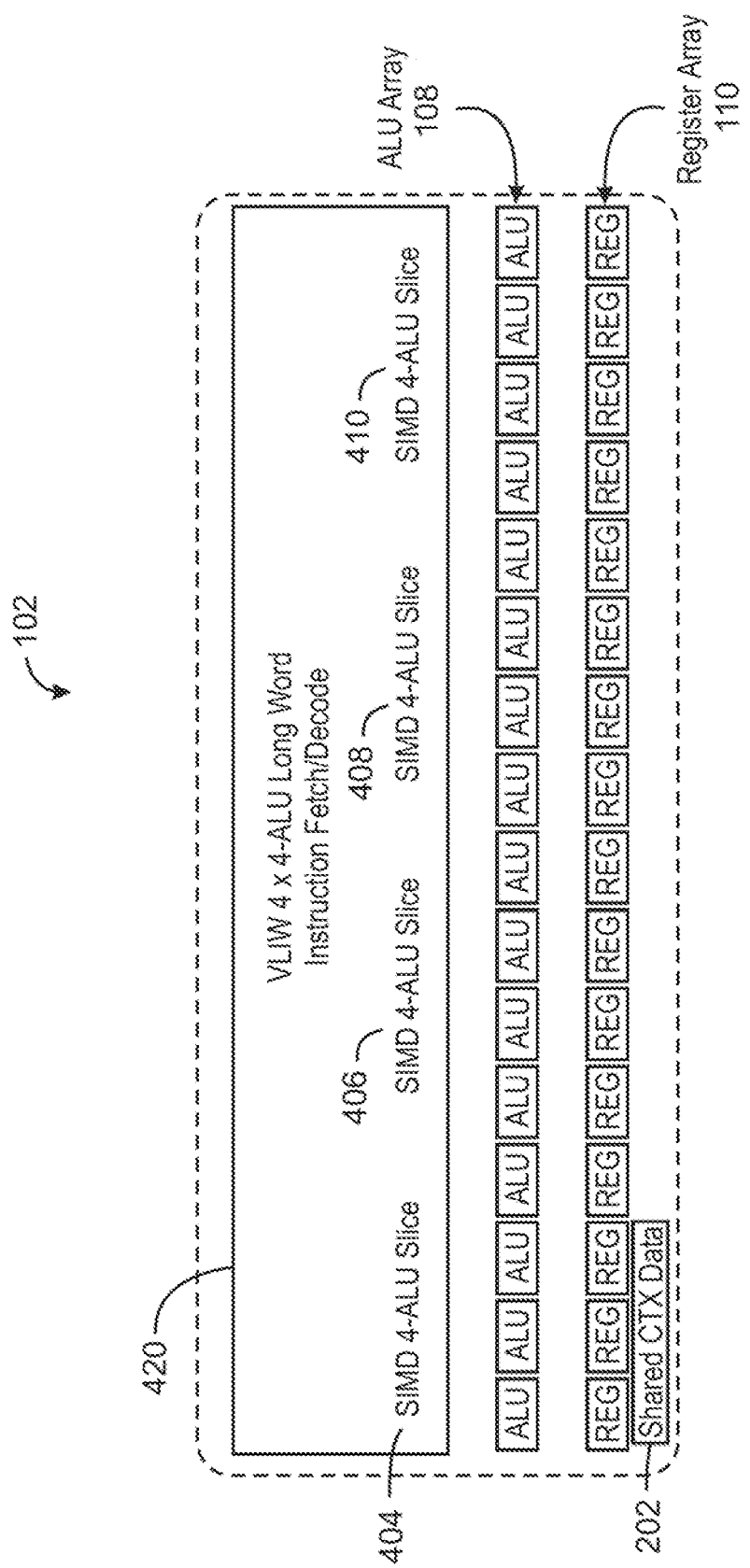
FIG. 4A is a diagram illustrating the SIMD processing unit with a very long instruction word, in accordance with embodiments.

FIG. 4A is a diagram 400 illustrating the SIMD processing unit 102 with a very long instruction word 402, in accordance with embodiments. The VLIW 402 is a 16-wide instruction word that that may be fetched from an instruction set and then decoded. Several SIMD ALU slices can be used to process the VLIW. As shown, four 4-lane ALU slices may be used in parallel to process the 16-wide instruction word.

The SIMD processing unit 102 is configured with four SIMD slices, an SIMD ALU slice 404, an SIMD ALU slice 406, an SIMD ALU slice 408, and SIMD ALU slice 410. Each SIMD ALU slice in FIG. 4A is 4 lanes wide. As shown, the four 4-lane ALU slices may be used in parallel to process the 16-wide VLIW. In embodiments, an SIMD processing unit may be dynamically arranged at runtime to contain all 4-lane ALU channels with the same clock frequency and voltage settings.

Figure 4B:
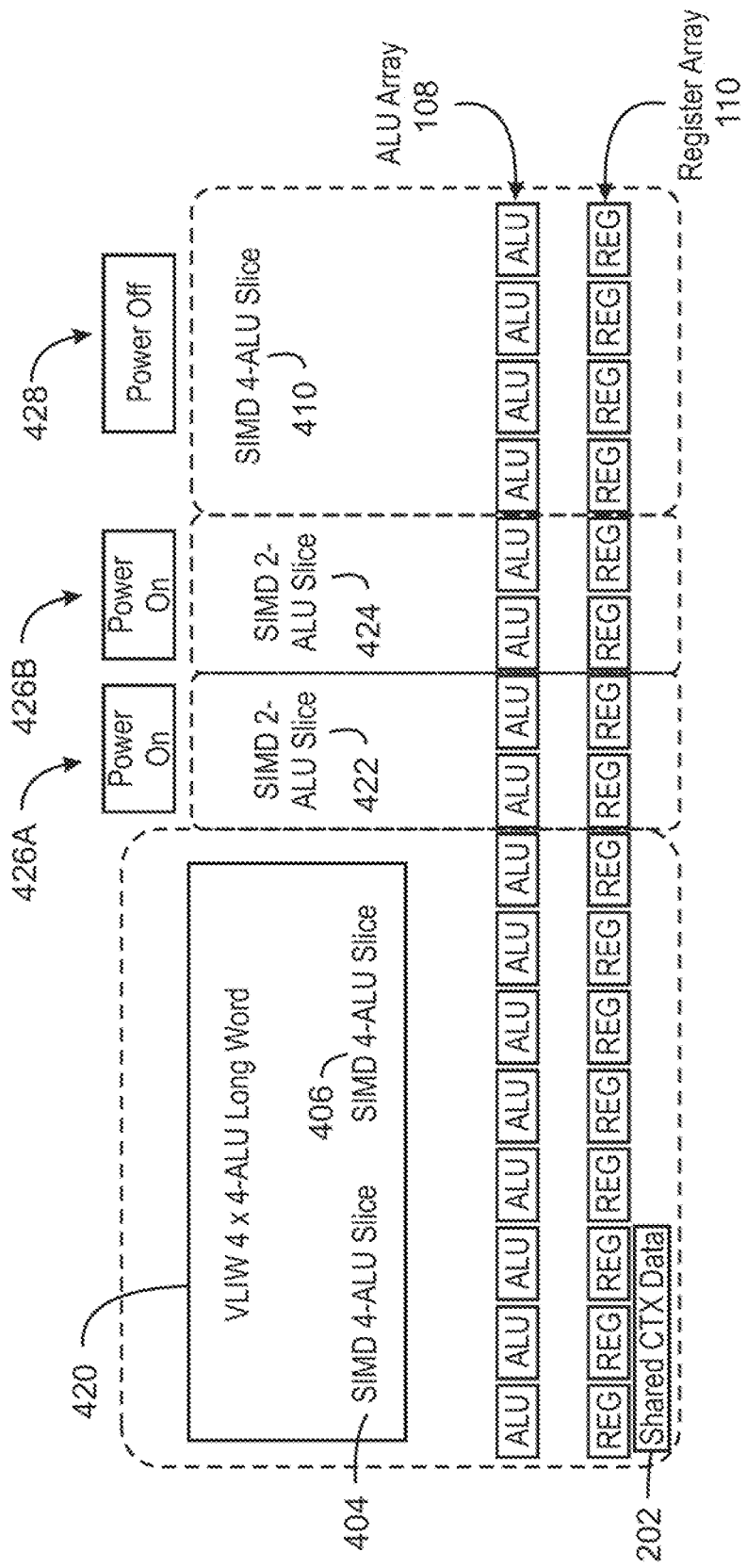
FIG. 4B is a block diagram of example variable width SIMD slices.

FIG. 4B is a diagram 420 illustrating the SIMD processing unit 102 with a VLIW fetched and decoded using two SIMD ALU slices, in accordance with embodiments. The SIMD processing unit 102 is reconfigured with five SIMD slices, the SIMD ALU slice 404, the SIMD ALU slice 406, an SIMD ALU slice 422, an SIMD ALU slice 424, and the SIMD ALU slice 410. Each of the SIMD ALU 404, the SIMD ALU slice 406, and the SIMD ALU slice 410 are each 4 lanes wide. The SIMD ALU slice 422 and the SIMD ALU slice 424 are both two lanes wide. As shown, the SIMD ALU 404 the SIMD ALU slice 406 may be used in parallel to process the 16-wide VLIW. Accordingly, in embodiments, the SIMD processing unit may be arranged to contain 8-wide ALU channels with a different clock rate and voltage setting. Since the VLIW is 16 wide, it will take two clock cycles to process the entire VLIW, with 8-wide of the VLIW being processed every cycle.

The SIMD processing unit 102 includes SIMD ALU slice 422 and the SIMD ALU slice 424 both powered on, as shown by a powered on status 426A and a powered on status 426B. The SIMD ALU slice 410 is powered off, as shown by the powered off status 428.

Figure 5:
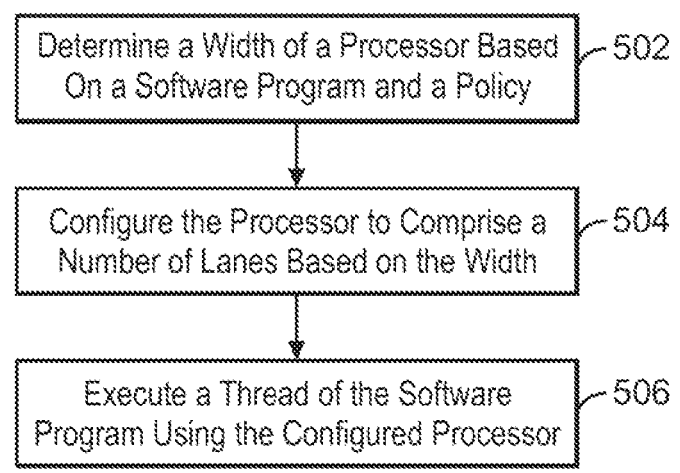
FIG. 5 is a process flow diagram showing a method for providing a scalable computing array, in accordance with embodiments.

FIG. 5 is a process flow diagram 500 showing a method for providing a scalable computing array, in accordance with embodiments. At block 502, a width of the processor may be determined. The width of the processor may be based on a software program and a specified policy. At block 504, the processor may be configured to comprise a number of lanes based on the width of the processor. At block 506, a thread of the software program may be executed using the configured processor. In this manner, the SIMD processing unit can grow or shrink in ALU dimensions at run time based on the compile time policy, machine instructions generated manually, or by a compiler. Additionally, a function call specified policy, which affects command and status registers in the configurable ALU array, may be used to configure the number of lanes of the processor. Further, dynamic thread behavior may be used to implement change lane configurations, implement scoreboarding, power policies, and voltage and frequency policies in a dynamic fashion. Dynamic reconfiguration of SIMD processing unit during thread execution may also occur using the controller.

In embodiments, the width of the processor may be determined by score boarding a thread of the software program using the configured SIMD processing unit. The SIMD processing unit may then be dynamically adjusted to a new width. Score boarding, as used herein, includes determining a power performance of the thread and identifying a memory cache hierarchy behavior. In an embodiment, machine instructions may be generated to set the memory policy, or command and status registers may be used to implement a memory policy. The width of the thread may be determined based on the power performance of the thread or the memory cache hierarchy behavior.

Furthermore, in embodiments, a specified policy may be used to determine the width of the processor. The policy may specify the clock frequency of the processor. Accordingly, a specified policy may be used to adjust the clock frequency. Additionally, in embodiments, the clock frequency may be adjusted based on a compile time directive or a function call invoked from within the thread to be processed. The clock may also be adjusted to a preset rate based on a compile time directive or a function call invoked from within the thread to be processed. Function calls can be used to provide policy guidance including but not limited to thread priority, thread power, performance targets, thread resource use priority, or thread memory hierarchy preferences for pinning pages.

Moreover, the clock frequency or a voltage may be adjusted based on score boarding. The voltage may also be adjusted based on a compile time directive or a function call invoked from the thread to be processed. In embodiments, the voltage may be adjusted based on score boarding or compile time hints. A compile time policy hint is generated when compilers analyze the software code for SIMD data type vector widths and corresponding memory size usage implications to provide policies for SIMD processing unit width configurations. The compile time hints may also be used to determine thread priority, thread power or performance targets, thread resource use priority, and thread memory hierarchy preferences for pinning pages. Accordingly, an SIMD processing unit may be dynamically arranged at run-time to contain all 4-lane ALU channels with the same clock frequency and voltage settings. Another SIMD processing unit may be arranged as an 8-wide processing unit with a different clock rate and voltage setting.

In embodiments, the SIMD slices may be homogenous with the same number of lanes per slice. Such a configuration may be use to achieve a high resource utilization when compared to SIMD slices that are not homogeneous. Such a grouping of SIMD slices may also have little or no stall behavior. Accordingly, threads with high stall behavior based on memory cache behavior or threads which high stall behavior which exhibit high resource dependencies and resource contention may be well suited for a homogenous number of lanes per slice. In embodiments, the SIMD slices may be heterogeneous with different number of ALUs per slice. Such a configuration may be used with threads that are balanced to include no stall, high stall, medium stall, or any other combination which meets various policy criteria as discussed above.

In embodiments, the homogeneous or heterogeneous thread groups may be prioritized a-priori according to compile-time hints. Additionally, in embodiments, the homogeneous or heterogeneous thread groups may be determined dynamically using a run-time policy resulting from score-boarding. Runtime score boarding to determine SIMD width and memory use may also be used to characterize thread behavior. For example, runtime score boarding may be used to determine thread width, SIMD utilization, and to identify memory cache hierarchy behavior.

Furthermore, in embodiments, each SIMD unit is both run-time score boarded and compile-time characterized for run-time resource usage utilization. For example, score characterization, or score boarding for memory activity, may occur at compile time. Compilers can perform characterization of SIMD instruction and thread behavior in terms of the memory cache hierarchy utilization. For example, the characterization may include identification of threads which use only register memory, threads which bleed out into local memory, and threads which access slower system memory. The SIMD processing unit lane width, the associated registers, and the shared memory can be optimized accordingly for direct memory access (DMA) word transfer width to match the SIMD traffic. The compiler may add directives into the generated code to control policy such as power, voltage, frequency, and lane widths.

Figure 6:
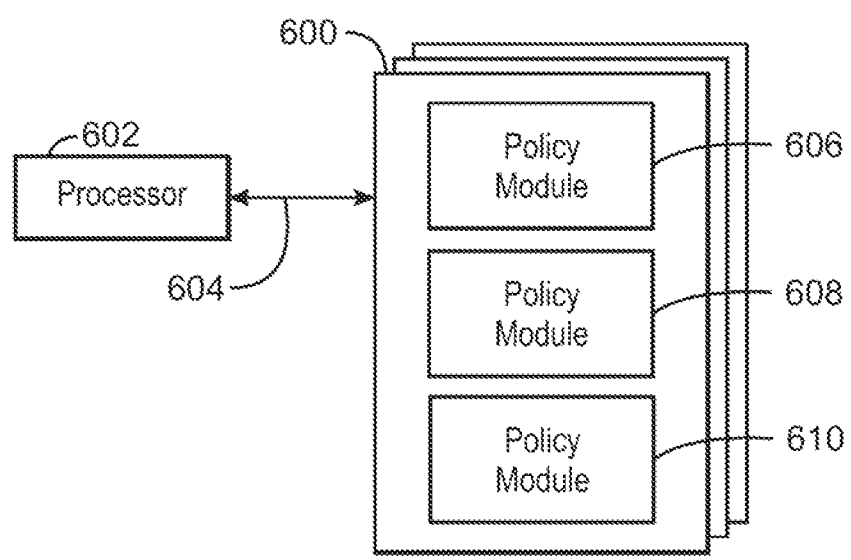
FIG. 6 is a block diagram showing tangible, non-transitory computer-readable media that stores code for providing a scalable computing array, in accordance with embodiments.

FIG. 6 is a block diagram 600 showing tangible, non-transitory computer-readable media that stores code for providing a scalable computing array, in accordance with embodiments. The tangible, non-transitory computer-readable media 600 may be accessed by a processor 602 over a computer bus 604. Furthermore, the tangible, non-transitory computer-readable media 600 may include code configured to direct the processor 602 to perform the methods described herein.

The various software components discussed herein may be stored on the tangible, non-transitory computer-readable media 600, as indicated in FIG. 6. For example, policy module 606 may be configured to determine a width of the processor. A configuration module 608 may configure the processor to comprise a number of lanes based on the width of the processor. An execution module 610 may be configured to execute a thread of the software program using the configured processor.

The block diagram of FIG. 6 is not intended to indicate that the tangible, non-transitory computer-readable media 600 is to include all of the components shown in FIG. 6. Further, the tangible, non-transitory computer-readable media 600 may include any number of additional components not shown in FIG. 6, depending on the details of the specific implementation.

Figure 7:
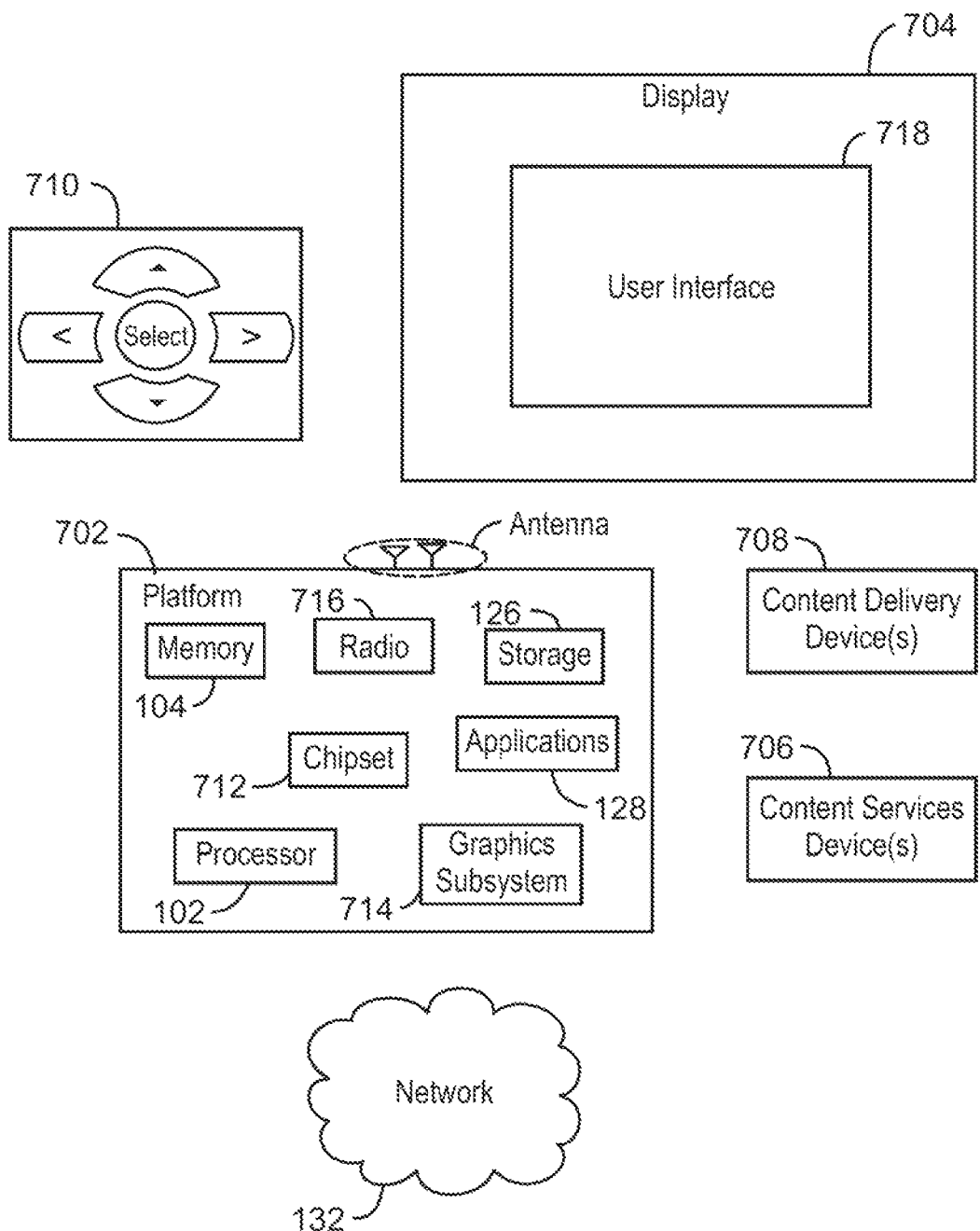
FIG. 7 is a block diagram of an exemplary system for providing a scalable computing array, in accordance with embodiments.

FIG. 7 is a block diagram of an exemplary system 700 for providing a scalable computing array, in accordance with embodiments. Like numbered items are as described with respect to FIG. 1. In some embodiments, the system 700 is a media system. In addition, the system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/ PDA, television, smart device (e.g., smart phone, smart tablet or smart television), mobile internet device (MID), messaging device, data communication device, or the like.

In various embodiments, the system 700 comprises a platform 702 coupled to a display 704. The platform 702 may receive content from a content device, such as content services device(s) 706 or content delivery device(s) 708, or other similar content sources. A navigation controller 710 including one or more navigation features may be used to interact with, for example, the platform 702 and/or the display 704. Each of these components is described in more detail below.

The platform 702 may include any combination of a chipset 712, an SIMD processing unit 102, a memory device 104, a storage device 126, a graphics subsystem 714, software 128, and a radio 716. The chipset 712 may provide intercommunication among the SIMD processing unit 102, the memory device 104, the storage device 126, the graphics subsystem 714, the software 128, and the radio 714. For example, the chipset 712 may include a storage adapter (not shown) capable of providing intercommunication with the storage device 126.

The SIMD processing unit 102 may be a standalone unit, or the SIMD processing unit 102 may be implemented as a component of a Complex Instruction Set Computer (CISC) or Reduced Instruction Set Computer (RISC) processors, x86 instruction set compatible processors, multi-core, or any other microprocessor or central processing unit (CPU). In some embodiments, the SIMD processing unit 102 is a component of dual-core processor(s), dual-core mobile processor(s), or the like.

The memory device 104 may be implemented as a volatile memory device such as, but not limited to, a Random Access Memory (RAM), Dynamic Random Access Memory (DRAM), or Static RAM (SRAM). The storage device 126 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, the storage device 126 includes technology to increase the storage performance enhanced protection for valuable digital media when multiple hard drives are included, for example.

The graphics subsystem 714 may perform processing of images such as still or video for display. An analog or digital interface may be used to communicatively couple the graphics subsystem 714 and the display 704. For example, the interface may be any of a High-Definition Multimedia Interface, DisplayPort, wireless HDMI, and/or wireless HD compliant techniques. The graphics subsystem 714 may be integrated into the SIMD processing unit 102 or the chipset 712. Alternatively, the graphics subsystem 714 may be a stand-alone card communicatively coupled to the chipset 712.

The graphics and/or video processing techniques described herein may be implemented in various hardware architectures. For example, graphics and/or video functionality may be integrated within the chipset 712. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 716 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 716 may operate in accordance with one or more applicable standards in any version.

The display 704 may include any television type monitor or display. For example, the display 704 may include a computer display screen, touch screen display, video monitor, television, or the like. The display 704 may be digital and/or analog. In some embodiments, the display 704 is a holographic display. Also, the display 704 may be a transparent surface that may receive a visual projection. Such projections may convey various forms of information, images, objects, or the like. For example, such projections may be a visual overlay for a mobile augmented reality (MAR) application. Under the control of one or more software 128, the platform 702 may display a user interface 718 on the display 704.

The content services device(s) 706 may be hosted by any national, international, or independent service and, thus, may be accessible to the platform 702 via the Internet, for example. The content services device(s) 706 may be coupled to the platform 702 and/or to the display 704. The platform 702 and/or the content services device(s) 706 may be coupled to a network 130 to communicate (e.g., send and/or receive) media information to and from the network 130. The content delivery device(s) 708 also may be coupled to the platform 702 and/or to the display 704.

The content services device(s) 706 may include a cable television box, personal computer, network, telephone, or Internet-enabled device capable of delivering digital information. In addition, the content services device(s) 706 may include any other similar devices capable of unidirectionally or bidirectionally communicating content between content providers and the platform 702 or the display 704, via the network 130 or directly. It will be appreciated that the content may be communicated unidirectionally and/or bidirectionally to and from any one of the components in the system 700 and a content provider via the network 130. Examples of content may include any media information including, for example, video, music, medical and gaming information, and so forth.

The content services device(s) 706 may receive content such as cable television programming including media information, digital information, or other content. Examples of content providers may include any cable or satellite television or radio or Internet content providers, among others.

In some embodiments, the platform 702 receives control signals from the navigation controller 710, which includes one or more navigation features. The navigation features of the navigation controller 710 may be used to interact with the user interface 718, for example. The navigation controller 710 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combinations thereof. Such physical gestures can be recognized and translated into commands or instructions.

Movements of the navigation features of the navigation controller 710 may be echoed on the display 704 by movements of a pointer, cursor, focus ring, or other visual indicators displayed on the display 704. For example, under the control of the software 128, the navigation features located on the navigation controller 710 may be mapped to virtual navigation features displayed on the user interface 718. In some embodiments, the navigation controller 710 may not be a separate component but, rather, may be integrated into the platform 702 and/or the display 704.

The system 700 may include drivers (not shown) that include technology to enable users to instantly turn on and off the platform 702 with the touch of a button after initial boot-up, when enabled, for example. Program logic may allow the platform 702 to stream content to media adaptors or other content services device(s) 706 or content delivery device(s) 708 when the platform is turned "off." In addition, the chipset 712 may include hardware and/or software support for 5.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 700 may be integrated. For example, the platform 702 and the content services device(s) 706 may be integrated; the platform 702 and the content delivery device(s) 708 may be integrated; or the platform 702, the content services device(s) 706, and the content delivery device(s) 708 may be integrated. In some embodiments, the platform 702 and the display 704 are an integrated unit. The display 704 and the content service device(s) 706 may be integrated, or the display 704 and the content delivery device (s) 708 may be integrated, for example.

The system 700 may be implemented as a wireless system or a wired system. When implemented as a wireless system, the system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 7.

Figure 8:
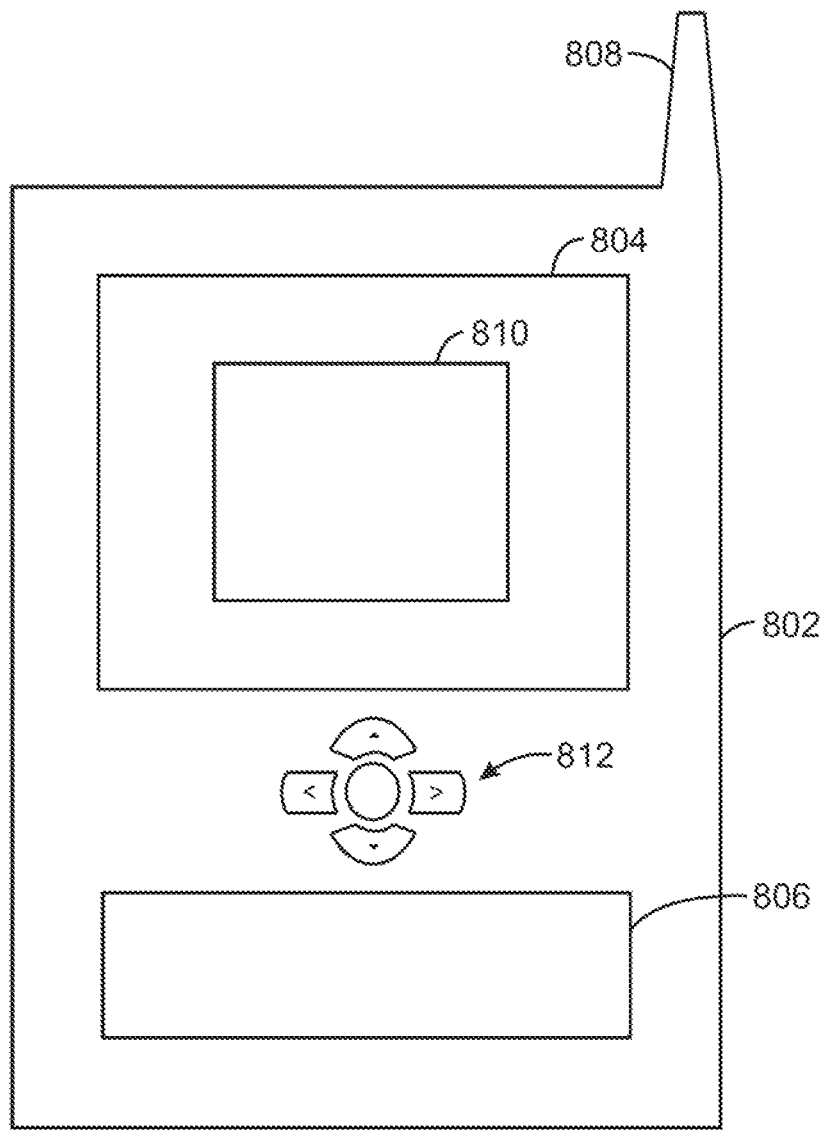
FIG. 8 is a schematic of a small form factor device in which the system of FIG. 7 may be embodied, in accordance with embodiments.

FIG. 8 is a schematic of a small form factor device 800 in which the system 700 of FIG. 7 may be embodied, in accordance with embodiments. Like numbered items are as described with respect to FIG. 8. In some embodiments, for example, the device 800 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well.

As shown in FIG. 8, the device 800 may include a housing 802, a display 804, an input/output (I/O) device 806, and an antenna 808. The device 800 may also include navigation features 810. The display 804 may include any suitable display unit for displaying information appropriate for a mobile computing device. The I/O device 806 may include any suitable I/O device for entering information into a mobile computing device. For example, the I/O device 806 may include an alphanumeric keyboard, a numeric keypad, a touch pad, input keys, buttons, switches, rocker switches, microphones, speakers, a voice recognition device and software, or the like. Information may also be entered into the device 800 by way of microphone. Such information may be digitized by a voice recognition device.

In embodiments, the image capture mechanism may be a component of a mobile computing device. For example, the camera device developed according to MIPI CSI Alliance standards may be an image capture mechanism integrated with at least one or more of the computing device 100 of FIG. 1A, the computing device 150 of FIG. 1B, the system 800 of FIG. 8, or any combinations thereof. The image capture mechanism may include various sensors, such as a depth sensor, an image sensor, an infrared sensor, an X-Ray photon counting sensor or any combination thereof. The image sensors may include charge-coupled device (CCD) image sensors, complementary metal-oxide-semiconductor (CMOS) image sensors, system on chip (SOC) image sensors, image sensors with photosensitive thin film transistors, or any combination thereof.

Figure 9:
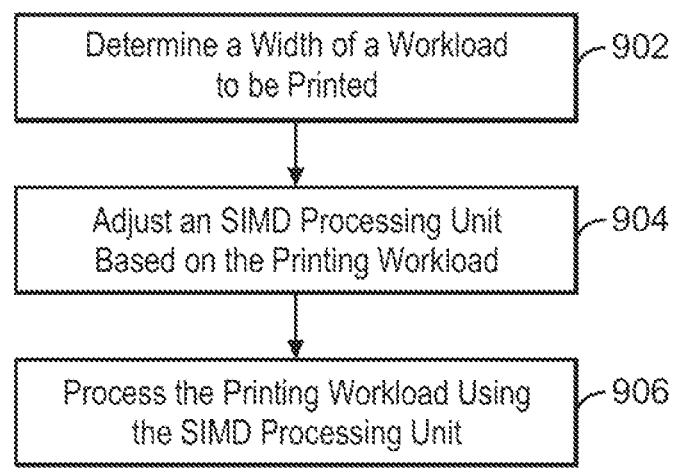
FIG. 9 is a process flow diagram illustrating a method for printing an image using a scalable computing array, in accordance with embodiments.

FIG. 9 is a process flow diagram 900 illustrating a method for printing an image using a scalable computing array, in accordance with embodiments. The method 900 can be implemented with a printing device, such as the printing device 134 of FIG. 1. The printing device 136 may include a print object module 138.

At block 902, the print object module 136 can determine a width of a workload to be printed. The width of the SIMD processor may be based on a software program such as a print driver, a specified policy, or any combinations thereof. At block 904, the print object module 136 can adjust an SIMD processing unit based on the printing workload. In this manner, the SIMD processing unit can grow or shrink in ALU dimensions at run time based on a compile time policy, a function call specified policy, or dynamic thread behavior of the workload. Dynamic re-configuration of SIMD processing unit during thread execution may also occur. At block 906, the print object module 136 can process the printing workload using the SIMD processing unit. Accordingly, the printing workload may be printed using the SIMD processing unit.

The process flow diagram of FIG. 9 is not intended to indicate that the steps of the method 900 are to be executed in any particular order, or that all of the steps of the method 900 are to be included in every case. Further, any number of additional steps may be included within the method 500 and the method 900, or any combinations thereof, depending on the specific application. For example, the printing device 134 may print an image that was previously processed using a scalable computing array.

Example 1

A method for providing a scalable computing array is provided herein. The method includes determining a width of a processor based on a software program, and a specified policy. The processor may be configured to comprise a number of lanes based on the width. A thread of the software program may be executed using the configured processor.

Determining the width of the processor may include a compiler that compiles the software program. The compiler may be used to determine the width of the processor based on a width of an instruction of the program. Determining the width of the processor may also include score boarding the thread. Score boarding includes, wherein score boarding determining a power performance of the thread identifying a memory cache hierarchy behavior. The width of the thread may be determined based on the power performance of the thread or the memory cache hierarchy behavior. Additionally, determining the width of the processor may include invoking a function call from within the thread, wherein the thread specifies the width.

A clock frequency may be adjusted based on the specified policy. The clock frequency may also be adjusted based on a compile time directive or a function call invoked from within the thread. A voltage may be adjusted based on score boarding. The voltage may also be adjusted based on a compile time directive or a function call invoked from within the thread. Additionally, a clock may be adjusted to a preset rate based on a compile time directive; or a function call invoked from within the thread. The clock may also be adjusted at run time based on score boarding. A voltage may be adjusted based on score boarding or compile time hints. One or more lanes of the processor may be powered off in response to a determination by the controller that the one or more lanes are inactive. A lane may include a one byte wide arithmetic and logic unit (ALU) and a register of the one byte wide ALU. The policy may specify determining the width based on one or more of a thread priority, balancing stalls, power targets, performance targets, thread resource use priority or thread memory hierarchy preferences for pinning pages. The software program may include comprises very long instruction words (VLIW) or single instruction multiple data (SIMD) instructions.

Example 2

A apparatus is described herein. The apparatus includes a plurality of arithmetic and logic units (ALUs), a plurality of registers of the ALUs, a plurality of single instruction multiple data (SIMD) controllers, and a controller. The controller may configure one or more processors. Each processor may include one of the SIMD controllers, a specified number of the ALUs, and a specified number of the registers. The controller may also modifies the specified number of the ALUs during runtime of a thread executing on one of the one or more process, based on an instruction of the thread and a specified policy.

The specified number of the ALUs may be modified by powering on one or more of the ALUs or powering on one or more of the registers. The specified number of the ALUs may also be modified by powering off one or more of the ALUs or powering off one or more of the registers. The number of ALUs in each processor of the one or more processors may be configured using a machine instruction. When at least one of the one or more processors is a VLIW processor, and the number of ALUs in the VLIW processor may be configured using a machine instruction. Further, a power policy may be configured for each processor of the one or more processors using a machine instruction.

The number of ALUs in each processor of the one or more processors is may be configured using a context control register. When at least one of the one or more processors is a VLIW processor, and the number of ALUs in the VLIW processor may be configured using a context control register. Additionally, a power policy may be configured for each processor of the one or more processors using a context control register. A policy state may comprise at least one of a power off state, a low power state, a normal power state, a high power state, a power burst state, or any combination thereof, and each policy state may comprise corresponding voltage and frequency levels that are predetermined or set manually.

Example 3

At least one machine readable medium having instructions stored therein is described herein. In response to being executed on a computing device, the instructions cause the computing device to configure one or more processors to execute a thread of a software program. Each of the processors may include a SIMD controller, a specified number of arithmetic logic units (ALUs), and a specified number of registers. The instructions may also the computing device to modify the specified number of ALUs during runtime of the thread executing on one or more of the processors based on an instruction of the thread and a specified policy.

The instructions may also cause the computing device to modify the specified number of ALUs at runtime in response to being executed on the computing device. Further, the instructions may also cause the computing device to determine an initial number of ALUs for the thread based on a compilation of the software program in response to being executed on the computing device.

Example 4

A printing device to print a workload processed using a scalable computing array is described herein. The printing device may include a print object module configured to determine a width of a workload to be printed. The print object module may be further configured to adjust an SIMD processing unit based on the printing workload. Additionally, the print object module may be configured to process the printing workload using the SIMD processing unit.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method for providing a scalable computing array, comprising:
   determining a width of a processor based on a software program, and a specified policy;
   configuring the processor to comprise a number of lanes based on the width; and
   executing a thread of the software program using the configured processor, wherein determining the width of the processor comprises invoking a function call from within the thread, and wherein the thread specifies the width.

2. The method of claim 1, wherein determining the width of the processor comprises:
   a compiler compiling the software program; and
   the compiler determining the width of the processor based on a width of an instruction of the program.

3. The method of claim 1, wherein determining the width of the processor comprises:
   score boarding the thread, wherein score boarding comprises:
      determining a power performance of the thread; and
      identifying a memory cache hierarchy behavior;
   and determining the width based on the power performance of the thread, or the memory cache hierarchy behavior.

4. The method of claim 1, comprising adjusting a clock frequency based on the specified policy.

5. The method of claim 4, comprising adjusting a clock frequency based on:
   a compile time directive; or
   a function call invoked from within the thread.

6. The method of claim 3, wherein a voltage is adjusted based on score boarding.

7. The method of claim 1, wherein a voltage is adjusted based on:
   a compile time directive; or
   a function call invoked from within the thread.

8. The method of claim 1, wherein a clock is adjusted to a preset rate based on:
   a compile time directive; or
   a function call invoked from within the thread.

9. The method of claim 3, wherein a clock is adjusted at run time based on score boarding.

10. The method of claim 3, wherein a voltage is adjusted based on score boarding or compile time hints.

11. The method of claim 1, wherein one or more lanes of the processor are powered off in response to a determination by the controller that the one or more lanes are inactive.

12. The method of claim 1, wherein a lane comprises:
one byte wide arithmetic and logic unit (ALU); and
a register of the one byte wide ALU.

13. The method of claim 1, wherein the policy specifies determining the width based on one or more of:
thread priority;
balancing stalls;
power targets;
performance targets;
thread resource use priority; and
thread memory hierarchy preferences for pinning pages.

14. The method of claim 1, wherein the software program comprises very long instruction words (VLIW), or single instruction multiple data (SIMD) instructions.

15. An apparatus, comprising:
a plurality of arithmetic and logic units (ALUs);
a plurality of registers of the ALUs; and
a plurality of single instruction multiple data (SIMD) controllers; and
a controller, wherein the controller:
configures one or more processors, each processor comprising:
one of the SIMD controllers;
a specified number of the ALUs; and
a specified number of the registers; and
modifies the specified number of the ALUs during runtime of a thread executing on one of the one or more process, based on an instruction of the thread and a specified policy, wherein determining the specified number of ALUs comprises invoking a function call from within the thread, and wherein the thread specifies the number of ALUs.

16. The apparatus of claim 15, wherein the specified number of the ALUs is modified by:
powering on one or more of the ALUs; and
powering on one or more of the registers.

17. The apparatus of claim 15, wherein the specified number of the ALUs is modified by:
powering off one or more of the ALUs; and
powering off one or more of the registers.

18. The apparatus of claim 15, wherein the number of ALUs in each processor of the one or more processors is configured using a machine instruction.

19. The apparatus of claim 15, wherein at least one of the one or more processors is a VLIW processor, and the number of ALUs in the VLIW processor is configured using a machine instruction.

20. The apparatus of claim 15, wherein a power policy is configured for each processor of the one or more processors using a machine instruction.

21. The apparatus of claim 15, wherein the number of ALUs in each processor of the one or more processors is configured using a context control register.

22. The apparatus of claim 15, wherein at least one of the one or more processors is a VLIW processor, and the number of ALUs in the VLIW processor is configured using a context control register.

23. The apparatus of claim 15, wherein a power policy is configured for each processor of the one or more processors using a context control register.

24. The apparatus of claim 15, wherein a policy state may comprise at least one of a power off state, a low power state, a normal power state, a high power state, a power burst state, or any combination thereof.

25. The apparatus of claim 24, wherein each policy state comprises corresponding voltage and frequency levels that are predetermined or set manually.

26. At least one machine readable medium comprising a plurality of instructions that, in response to being executed on a computing device, cause the computing device to:
configure one or more processors to execute a thread of a software program, each of the processors, comprising:
a SIMD controller;
a specified number of arithmetic logic units (ALUs); and
a specified number of registers; and
modify the specified number of ALUs during runtime of the thread executing on one or more of the processors based on an instruction of the thread and a specified policy, wherein determining the specified number of ALUs comprises invoking a function call from within the thread, and wherein the thread specifies the number of ALUs.

27. The machine readable medium of claim 26, comprise an instruction that, in response to being executed on the computing device, cause the computing device to modify the specified number of ALUs at runtime.

28. The machine readable medium of claim 26, comprise an instruction that, in response to being executed on the computing device, cause the computing device to determine an initial number of ALUs for the thread based on a compilation of the software program.

29. A printing device to print a workload processed using a scalable computing array, comprising a print object module configured to:
determine a width of a workload to be printed;
adjust a width of an SIMD processing unit based on the width of the printing workload; and
process the printing workload using the SIMD processing unit.

* * * * *